United States Patent Office 3,341,646
Patented Sept. 12, 1967

3,341,646
METHOD OF DE-MOLDING POLYURETHANE PLASTICS
J W. Britain, New Martinsville, W. Va., assignor to Mobay Chemical Company, Pittsburgh, Pa., a corporation of Delaware
No Drawing. Filed Oct. 4, 1965, Ser. No. 492,941
13 Claims. (Cl. 264—213)

The invention relates to polyurethane plastics and to a method for preparing the same. More particularly it relates to an improved mold release system for use when shaping polyurethane plastics, and is a continuation-in-part of my copending application, Ser. No. 227,942 filed on Oct. 2, 1962.

It has been found that when a polyurethane plastic is being prepared by the reaction of isocyanate groups and active hydrogen containing groups as determinable by the Zerewitinoff method the polyurethane has a tendency to adhere strongly to the surfaces which contacts unless such surfaces have previously been treated with a mold release agent. A particular problem has been encountered for the release of a substantially linear thermoplastic polyurethane which is particularly desirable for use in the preparation of Spandex threads, filaments, fibers and the like. Such a polyurethane does not reach a solid state at the reaction temperature and must be cooled to room temperature before it begins to solidify and reaches a state where it can be conveniently handled. These polyurethanes cannot be released from the mold in which they are prepared immediately after they have been removed from the oven because they are in a flowable or tacky state and must be cooled to room temperature before release can be attempted. Removal from a mold that has been coated with a wax type release agent that is a solid at room temperature is difficult if not altogether impossible. When a Teflon mold is used, the cooling of the polyurethane causes adhesion to the mold thereby spoiling the outward appearance of the polyurethane and causing polyurethane deposits in the mold. Silicone oils alone have also been used; however, removal cannot be attempted without some tearing or other imperfection occurring to the polyurethane.

A similar problem has been encountered in the preparation of thermoplastic polyurethane casting compositions which solidify when heated at an elevated temperature for several minutes. It is highly desirable that such materials be cast into a mold, heated in an oven and removed immediately, even while the mold is still hot, so that production on a high efficiency level can be maintained. Heretofore, such a procedure was not feasible since the solid but tacky polyurethane material adhered to the mold while it was still warm and even after the mold and the polyurethane had cooled.

It is therefore an object of this invention to provide a method for shaping polyurethanes in general which is devoid of the foregoing disadvantages.

Another object of this invention is to provide an improved method for the molding of cast thermoplastic polyurethanes whereby release from the mold is facilitated.

Yet another object of this invention is to provide a process for shaping a polyurethane wherein perfect release from a hot mold can be obtained for polyurethanes which are not completely cured.

Still another object of this invention is to provide an improved process for releasing polyurethanes which are viscous, sticky and/or flowable at high temperatures from a mold after the polyurethane has been cooled to cause solidification thereof.

Still further, it is an object of this invention to provide a mold release system which will facilitate the release of substantially linear thermoplastic polyurethanes which are particularly suitable for use in the preparation of Spandex threads, fibers, filaments and the like.

The foregoing objects and others are accomplished in accordance with this invention, generally speaking, by providing a method for shaping a polyurethane which comprises preparing a shaping means adapted to allow good release of the polyurethane therefrom, at least the shaping surface of which is constructed of polytetrahaloethylene or polypropylene having a melting point of at least about 300° F., coating the polytetrahaloethylene or polypropylene shaping surface with an uninterrupted layer of an organo silicone, charging the polyurethane reaction mixture to be shaped onto the shaping surface, allowing sufficient reaction to take place to yield a solid polyurethane, and removing the resulting polyurethane from the shaping surface. The liquid polyurethane reaction mixture reacts chemically to form a polyurethane while on or in the shaping means or mold and therefore, while it is in contact with the silicone. The resulting polyurethane plastic may then be removed from the mold after the reaction mixture has been heated at an elevated temperature and cooled to room temperature. Perfect release may also be obtained if the heated polyurethane is cooled only to a temperature at which the polyurethane plastic can be conveniently handled even though the shaping means or mold may still be hot.

Surprisingly, while polytetrahaloethylenes, polypropylene, or silicone oils alone are not satisfactory, it has been found that the use of a polytetrahaloethylene or polypropylene mold in combination with a layer of an organo-silicone on the shaping surface thereof as a mold release system has consistently enabled clean separation of polyurethane plastics from a molding surface. Further, although the use of a polytetrahaloethylene or polypropylene mold coated with an organo-silicone has been found to be particularly advantageous for use as a mold release agent for thermoplastic polyurethanes, this mold release combination can be used with equally satisfactory results as a mold release for other types of polyurethanes such as, for example, thermoset polyurethanes, wherein release from a mold is not as difficult.

Any suitable organo-silicone oil can be used as the silicone component of the mold release system of this invention, particularly those which contain groups that are non-reactive with the components of the polyurethane reaction mixture. For example, silicone oils having recurring dimethylsiloxane groups are particularly suitable for practicing the present invention since they are characterized by a low rate of change in viscosity over a wide temperature range. These silicone oils can be obtained by the hydrolysis of dimethyldichlorosilane or dimethyldiethoxysilane and are colorlesss oils consisting of polymers of dimethylsiloxane having the formula $[(CH_3)_2SiO]_x$, wherein $x$ is an integer greater than two. The oily, liquid dimethylpolysiloxane polymers having a viscosity within the range of from about 3.0 to about 1000 cst. at 25° C. are preferred and those having a viscosity within the range of from about 100 to about 1000 cst. at 25° C. are especially preferred.

Any other suitable organo-siloxane can be used as the silicone component of the release agent of this invention with equally satisfactory results. For example, an aryl group, such as, for example, phenyl; an alkoxy group, such as, methoxy, ethoxy, propoxy, and the like radicals can be substituted for one of the methyl groups in the polydimethylsiloxane. Generally, the formula $(R_2SiO)_x$ can be used to describe the polysiloxanes preferred in practicing this invention, wherein R is a methyl or an aryl radical and $x$ is an integer greater than two. The R—Si linkage is primarily responsible for the thermal stability of these compounds.

The invention also contemplates the use of either linear or branched siloxane-oxyalkylene block copolymers. The branched siloxane-oxyalkylene block copolymers may contain any number of branch points. A mixture of linear and branched siloxane-oxyalkylene block copolymers may also be used. The term "block-copolymer" as used herein will mean that there is at least one block or section of the molecule which is a silicone polymer and at least one block or section which is an organic polymer. For example, a siloxane-oxyalkylene block copolymer having the following general formula can be used:

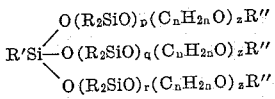

wherein R and R' are hydrocarbon radicals, either aliphatic, aromatic or cycloaliphatic, having from 1 to 8 carbon atoms; R'' is an organic radical, either aliphatic, cycloaliphatic, or aromatic, having from 1 to 8 carbon atoms; $p$, $q$ and $r$ each have a value of from 2 to 15 and $(C_nH_{2n}O)_z$ is a polyoxyalkylene block, such as, for example, a polyoxyethylene, polyoxypropylene or polyoxybutylene block containing from 10 to 50 oxyalkylene units, such as, for example, a mixture of polyoxyethylene and oxypropylene units containing from 17 to 19 oxyethylene units and 11 to 15 oxypropylene units. For example, a compound having the formula:

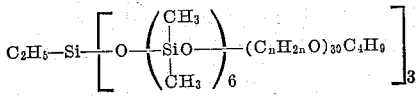

wherein $C_nH_{2n}O$ is a mixed polyoxyethylene and polyoxypropylene block containing about 17 oxyethylene units and about 13 oxypropylene units can be used. Other suitable compounds of the siloxane-oxyalkylene block copolymer type and a method for making them are disclosed in United States Letters Patent 2,834,748.

The organo-silicone component of the release agent can be applied to the mold directly as it is or it can be applied with the aid of a suitable solvent vehicle. Any suitable solvent can be used, such as, for example, benzene, hexane, chloroform, the chlorofluorohydrocarbons and other volatile solvents which will dissolve the silicone but which will not react with the components of the polyurethane reaction mixture. An emulsion of the organo-silicone in water or in any other solvent having groups that will react with the components of the polyurethane reaction mixture can also be applied to the mold surface providing the water or active solvent is thoroughly removed, for example, by evaporation, from the mold prior to casting of the polyurethane reaction mixture into the mold.

Various methods can be utilized to coat the mold, such as, for example, applying the organo-silicone coating solution with a brush or with a spray gun, or by dipping the mold into a suitable coating solution. The coating solution can also be wiped onto the mold. Any desired method may be used to apply the silicone component, but for best results a method which permits a thin, uninterrupted, continuous layer of organo-silicone release agent to be applied to the mold should be used.

Any suitable mold can be used for the shaping of the polyurethanes as long as at least the shaping surface is constructed of a polytetrahaloethylene or polypropylene. The molds can be made completely of a polytetrahaloethylene or polypropylene providing they are capable of withstanding temperatures of more than about 300° F. or the molds can be made of wood or metal such as, for example, steel, stainless steel, brass, copper, aluminum, and the like, the shaping surface of which is coated with a layer of a polytetrahaloethylene or polypropylene. The shaping surface or mold may have any desired configuration; however, slab type molds are preferred when preparing thermoplastic polyurethanes for use in spandex threads, fibers, filaments and the like since such polyurethanes can be readily removed from the slab molds, reduced to the desired particle size by chopping, grinding or the like and then processed further with maximum efficiency. In production systems, however, an endless belt may also be used as a casting surface for the shaping of polyurethanes. The process allows for continuous casting of a polyurethane onto a reinforced belt having a polytetrahaloethylene or polypropylene impregnated into it which is coated continuously by means of a brush or spray or the like. Perfect release can be obtained continuously to obtain an unmarred product and the operation can be carried out for a week or more before the belt need be cleaned, so good is the release obtained.

Any suitable polytetrahaloethylene polymer can be used, such as, for example, polytetrafluoroethylene, polytrifluorochloroethylene and the like. Polytetrafluoroethylene polymers used in accordance with this invention can be prepared by polymerizing under pressure tetrafluoroethylene gas, $CF_2{=}CF_2$, which is produced by the pyrolysis of chlorodifluoromethane at 250° C.

The polypropylene to be used in practicing this invention can be prepared by the process disclosed in U.S. Letters Patent 3,050,471 issued Aug. 21, 1962 to Anderson et al. which is incorporated herein by reference.

The process of this invention is particularly significant in the preparation of cast thermoplastic polyurethanes to be further processed into fibers, threads, filaments and the like, although it is equally important for the shaping of all other types of polyurethanes as well. The particular problem involved in the preparation of cast thermoplastic polyurethanes, however, resides in the fact that they must be removed from the shaping surface before complete curing has taken place and just after the plastic has become sufficiently solidified to be handled so that the polyurethane is suitable for further processing such as extrusion, transfer molding, injection molding, compression molding and the like. The soft, uncured polyurethane material is therefore difficult to remove from the mold without leaving a skin as well as the patches of the polyurethane on the shaping surface, particularly if the mold is still hot. As a consequence, the surfaces on which thermoplastic polyurethanes are cast must be cleaned after each casting operation and a polyurethane is prepared which has a marred and pitted surface. It has now been found, however, that the herein defined combination mold release agent will allow for perfect release of a thermoplastic cast polyurethane and that continuous casting operations can be carried out for a week or more without the need for cleaning the shaping surface. The polyurethane thus prepared can be further processed such as, for example, by grinding, chopping, dicing, cutting and the like, adding any suitable additives such as, for example, pigments, ultraviolet absorbers, optical brighteners and the like to produce desired physical and chemical properties in the final product, and then molding, extruding and the like into threads, fibers, filaments and molded articles of all kinds. The fibers, threads and filaments produced can be woven or interlaced with one another to form various fabrics suitable for use in garments such as, for example, stretch slacks and suits, elastic stockings, corsets and the like.

In a preferred method of practicing the present invention, a prepolymer prepared from a polyester having a molecular weight of about 2000 and 4,4'-diphenylmethane diisocyanate is combined with 1,4-butanediol. The liquid reaction mixture is cast into a polypropylene mold coated with polydimethylsiloxane and allowed to react. The polyurethane reaction mixture solidifies within about 10 minutes and is cool enough to handle in about 20 minutes at which time it is removed from the mold. The molded article is then cured at about 110° C. for about 18 hours, and the mold is available for reuse about every 30 minutes. A new coating of organo-silicone need not be applied for each molding cycle since the organo-silicone component of the mold release combination tends to adhere to the polytetrahaloethylene or polypropylene mold surface rather than to the polyurethane.

In another preferred mode of practicing this invention, the polyurethane reaction mixture is cast onto a shaping surface and heated at an elevated temperature until solidification of the reaction mixture has occurred. The solidified polyurethane is then immediately removed from the hot shaping surface and prepared for further processing into extruded and molded articles as described hereinbefore. The elevated temperature and time during which the reaction mixture is heated at this stage of the process is dependent on a variety of factors such as the components of the reaction mixture and the final product desired; however, it has been most consistently advantageous to heat the reaction mixture at about 110° C. for from about 10 to about 15 minutes.

Any suitable organic polyisocyanate may be used for the preparation of polyurethane plastics in the process of this invention. Some such suitable polyisocyanates are, for example, aliphatic, aromatic, alicyclic and heterocyclic polyisocyanates including ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 2,2 - diphenylpropane - 4,4' - diisocyanate, p - phenylene diisocyanate, m - phenylene diisocyanate xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4' - diisocyanate, dichlorohexamethylene diisocyanate, tetramethylene diisocyanate, pentamethylene diisocyanate, hxamethylene diisocyanate, 1 - chloro - benzene - 2,4 - diisocyanate, furfurylidene diisocyanate, triphenyl methane triisocyanate, naphthalene - 1,3,7 - triisocyanate, 4,4' - dimethyldiphenylmethane - 2,2',5,5' - tetraisocyanate; biuret triisocyanates, such as, for example, those prepared from 3 mols of hexamethylene diisocyanate and 1 mol of water; carbodiimides having free terminal NCO groups; dimers and trimers of any of the foregoing isocyanates having free NCO groups and the like and mixtures of any of the foregoing.

Any suitable organic compound containing at least two active hydrogen containing groups as determined by the Zerewitinoff method and having a molecular weight of at least 600 may be used to react with polyisocyanates in the preparation of polyurethane plastics in the process of this invention. Some such suitable compounds are, for example, hydroxyl polyesters, polyhydric polyalkylene ethers, polyhydric polythioethers, polyacetals and polyester amides. It is preferred that the organic compounds containing active hydrogen containing groups suitable for use in the process of this invention have a molecular weight of at least about 600, but most preferably within the range of about 1000 to 5000, a hydroxyl number of not more than about 225, but preferably within the range of about 20 to 112, and acid numbers, where applicable, preferably below about 10 but most preferably below about 2.

Any suitable hydroxyl polyester including lactone polyesters may be used, such as, for example, the reaction product of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylen glycol, 1,3-butylene glycol, 1,5-pentane diol, 1,4-pentan diol, 1,3-pentane diol, 1,6-hexane diol, 1,7-heptane dio glycerine, trimethylolpropane, 1,3,6-hexane triol, trietha nolamine, pentaerythritol, sorbitol and the like.

The hydroxyl polyester may also be a polyester amid such as is obtained, for example, by including some amin or amino alcohol in the reactants for the preparation o the polyesters. Thus, polyester amides may be obtaine by condensing an amino alcohol such as ethanolamin with the polycarboxylic acids set forth herein or the may be made using the same components that make u the hydroxyl polyester with only a portion of the com ponents being a diamine such as ethylene diamine an the like.

Any suitable polyhydric polyalkylene ether may be used such as, for example, the condensation product of an alkylene oxide beginning with any suitable initiator. The initiator may be a difunctional compound, including water, so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator, including as such amines, alcohols and the like, have from 2 to 8 active sites to which the alkylene oxides may add. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms and the like. The resulting polyhydric polyalkylene ethers with the various bases of nitrogen and the like may have either primary or secondary hydroxyl groups or mixtures of primary and secondary hydroxyl groups. It is preferred to use alkylene oxides which contain from 2 to 5 carbon atoms, generally speaking, it is advantageous to condense from about 5 to about 30 mols of alkylene oxide per functional group of the initiator. There are many suitable processes for the preparation of polyhydric polyalkylene ethers including U.S. Patents 1,922,459; 3,009,939 and 3,061,625 or by the process disclosed by Wurtz in 1859 and discussed in the Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arabitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl)ethylene diamine, diethylene triamine and the like.

Any suitable polyhydric polythioether may be used as, for example, the condensation product of thiodiglycol or the reaction product of a polyhydric alcohol, such as are disclosed herein for the preparation of the hydroxyl polyesters, with any other suitable thioetherglycol. Other suitable polyhydric polythioethers are disclosed in U.S. Patents 2,862,972 and 2,900,368.

Any suitable polyacetal may be used such as, for example, the reaction product of formaldehyde or any other suitable aldehyde with a polyhydric alcohol such as those disclosed herein for the preparation of the hydroxyl polyesters.

Mixtures of any of the compounds of the classes set forth hereinbefore may be used and such compounds may lso contain other substituents including halogen atoms, such as, for example, chloro, bromo, iodo and the like; nitro groups; alkoxy radicals such as, for example, methoxy, ethoxy, propoxy, butoxy and the like; carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and like groups.

Any suitable chain extending agent having a maximum molecular weight of about 500 and having at least two active hydrogen containing groups reactive with isocyanate groups may be used, such as, for example, diols including ethylene glycol, propylene glycol, butylene glycol, 1,4-butanediol, butenediol, butylnediol, xylylene glycols, amylene glycols, 1,4-phenylene-bis-beta-hydroxy ethyl ether, 1,3-phenylene-bis-beta-hydroxy ethyl ether, bis-(hydroxy-methylcyclohexane), hexanediol, thiodiglycol, and the like; diamines including ethylene diamine, propylene diamine, butylene diamine, hexamethylene diamine, cyclohexylene diamine, phenylene diamine, toluylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-amino benzyl alcohol, glycerine, trimethylol propane, hexanetriol, pentaerythritol and the like.

It is often advantageous to carry out the NCO/OH reaction in the presence of a catalyst.

Any suitable catalyst may be used to accelerate the reaction including, for example, tertiary amines such as dimethyl benzyl-amine, dimethyl stearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylamino-propane, tertiary amines with ester groups, salts of tertiary amines, especially with organic acids such as, for example, oleic acid, benzoic acid, and the like, dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," J. W. Britain and P. G. Germeinhardt, Journal of Applied Polymer Science, Volume IV, Issue No. 11, pages 207–211 (1960).

The invention is further illustrated by the following examples in which parts are given by weight unless otherwise specified.

Example 1

To about 100 parts of an hydroxyl terminated polyester having a molecular weight of about 2000, an hydroxyl number of about 56 and an acid number of about 1.5 and prepared from about 1 mol of ethylene glycol, about 1 mol of 1,4-butanediol and about 1.6 mols of adipic acid are added to about 9 parts 1,4-butanediol and about 40 parts 4,4'-diphenylmethane diisocyanate. Prior to the intermixing of three ingredients each is separately heated to a temperature of about 60° C. Upon the addition of the isocyanate to the polyester-butanediol mixture, mechanical mixing is conducted for a period of about 1 minute to insure the intimate contact of the ingredients. This reaction mixture is then cast into a slab type polytetrafluoroethylene mold which has been heated to about 110° C. and which has been previously coated with a thin layer of polydimethylsiloxane having a viscosity of about 500 cst. at 25° C. The mold and its contents are heated at 110° C. for 15 minutes during which time chemical reaction of the ingredients takes place. The mold and the polyurethane are cooled to room temperature and separation of the polyurethane from the mold is easily and readily accomplished.

When an organo-silicone oil was used directly on an aluminum mold without an intervening layer of polytetrafluoroethylene a clean separation was not obtained. When a polytetrafluoroethylene mold is used without a coating of an organo-silicone applied thereto, the polyurethane adhered to the mold and could not be released without some tearing occurring.

Example 2

To about 100 parts of the hydroxyl polyester of Example 1 is added about 5 parts of 1,4-butanediol and about 30 parts of 4,4'-diphenylmethane diisocyanate at 60° C. This reaction mixture is then cast into a slab type polypropylene mold capable of withstanding temperatures of more than about 300° F. and coated with a thin layer of a polydimethylsiloxane having a viscosity of about 600 cst. at 25° C. The mold and its contents are passed through an oven at a temperature of about 110° C. for about 15 minutes after which the polyurethane plastic thus formed is allowed to cool to room temperature. The polyurethane slab is removed easily in a unit from the silicone coated polypropylene mold.

When a polypropylene mold alone is used without a coating of silicone oil the cooled solid polyurethane adheres to the surface thereof.

Example 3

About 100 parts of a polyester prepared from ethylene glycol and adipic acid and having a molecular weight of about 2,000, a hydroxyl number of about 56 and an acid number of less than about 1.5 were mixed with about 19 parts of a compound having the formula

and about 40 parts of 4,4'-diphenylmethane diisocyanate were mixed rapidly into the resulting admixture. This casting composition was poured into a polypropylene mold coated with a thin uninterrupted layer of polydimethylsiloxane having a viscosity of about 600 cst. at 25° C. The mold and its contents are heated in an oven at a temperature of about 110° C. for about 15 minutes until solidification after which the polyurethane is removed from the mold immediately, while the mold is still hot. The polyurethane slab is easily removed in a unit.

When a polypropylene mold alone is used without a coating of silicone oil, the solid polyurethane adheres to the surface of the hot mold.

It is to be understood that any suitable organic polyisocyanate, organic compound containing at least two active hydrogen groups in the molecule, chain extending agent, and the like described herein, can be substituted for the particular ones employed in the preceding examples with satisfactory results. Moreover, any suitable mold having an inner surface of polytetrahaloethylene or polypropylene which is coated with an organo-silicone oil suitable for release of the molded polyurethane plastic as described herein can be substituted for those in the preceding examples with satisfactory results provided that the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A method for shaping a polyurethane which comprises preparing a shaping means adapted to allow good release of the polyurethane therefrom, at least the shaping surface of which is constructed of a member selected from the group consisting of a polytetrahaloethylene and polypropylene polymer by coating the said shaping surface with a layer of an organo-silicone oil, mixing an organic compound containing at least two reactive hydrogen atoms as determined by the Zerewitinoff method with an organic polyisocyanate, charging the resulting mixture onto the shaping surface, allowing sufficient reaction to take place to yield a solid polyurethane and removing the resulting thermoplastic polyurethane from the shaping surface.

2. The method of claim 1 wherein the shaping surface is constructed of a polytetrahaloethylene.

3. The method of claim 1 wherein the shaping surface is constructed of polypropylene.

4. The method of claim 2 wherein the polytetrahaloethylene is polytetrafluoroethylene.

5. The method of claim 1 wherein the organo-silicone oil has a viscosity of from about 3.0 to about 1000 cst. at 25° C.

6. The method of claim 1 wherein the polyisocyanate is 4,4'-diphenylmethane diisocyanate.

7. A method for molding a linear polyurethane which comprises providing a mold with a polypropylene surface having a substantially uniform coating of an organo-silicone oil, charging the mold with a liquid polyurethane reaction mixture, and, after reaction to form a substantially linear polyurethane, cooling the mold contents and removing the resulting thermoplastic polyurethane from the mold.

8. A method for molding a polyurethane which comprises providing a mold with a polytetrahaloethylene surface having a substantially uniform coating of an organo-silicone oil, charging the mold with a liquid polyurethane reaction mixture, and, after reaction to form a substantially linear polyurethane, cooling the mold contents and removing the resulting thermoplastic polyurethane from the mold.

9. A method for shaping of polyurethane which comprises preparing a shaping means adapted to allow good release of the polyurethane therefrom, at least the shaping surface of which is constructed of a member selected from the group consisting of a polytetrahaloethylene and polypropylene polymer having a melting point of at least about 300° F. by coating the said shaping surface with a layer of an organo-silicone, mixing an organic compound having reactive hydrogen atoms as determined by the Zerewitinoff method and a chain extending agent having a molecular weight of less than about 500 and containing reactive hydrogen atoms as determined in the Zerewitinoff method, with an organic polyisocyanate, charging the mixture onto the shaping surface, heating the mixture on the shaping surface at an elevated temperature until the mixture has solidified and removing the thermoplastic polyurethane from the shaping surface before the polyurethane and shaping surface have cooled to room temperature.

10. A method for shaping a polyurethane which comprises preparing a shaping means adapted to allow good release of the polyurethane therefrom, at least the shaping surface of which is constructed of a member selected from the group consisting of a polytetrahaloethylene and polypropylene polymer having a melting point of at least about 300° F. by coating the said shaping surface with a layer of an organo-silicone, mixing an organic compound having reactive hydrogen atoms as determined by the Zerewitinoff method and a chain extending agent having a molecular weight of less than about 500 and containing reactive hydrogen atoms as determined by the Zerewitinoff method, with an organic polyisocyanate, charging the mixture onto the shaping surface, heating the mixture on the shaping surface at an elevated temperature until the mixture has solidified, and removing the thermoplastic polyurethane from the shaping surface after the polyurethane and shaping surface have cooled to room temperature.

11. The method of claim 9 wherein the mixture and shaping surface are heated at a temperature of 110° C. from about 10 to about 15 minutes.

12. The method of claim 10 wherein the mixture and shaping surface are heated at a temperature of 110° C. for from about 10 to about 15 minutes.

13. A continuous method for the release of a thermoplastic polyurethane which comprises continuously coating an endless belt having polytetrahaloethylene or polypropylene impregnated in it with an organo-silicone oil, casting a thermoplastic polyurethane formulation onto the endless belt, and, after the polyurethane formulation reacts to form a solid, removing the resulting tacky, thermoplastic polyurethane from the belt surface.

References Cited

UNITED STATES PATENTS

| | | | |
|---|---|---|---|
| 2,811,408 | 10/1957 | Braley | 264—338 |
| 3,079,641 | 3/1963 | Knox | 264—321 |
| 3,106,487 | 10/1963 | Frost | 117—5.1 |
| 3,127,457 | 3/1964 | Di Pinto | 264—338 |

FOREIGN PATENTS 624,114  7/1961  Canada.

ROBERT F. WHITE, *Primary Examiner.*

R. B. MOFFITT, *Assistant Examiner.*